(12) United States Patent
Yamagata et al.

(10) Patent No.: US 9,419,910 B2
(45) Date of Patent: Aug. 16, 2016

(54) COMMUNICATION SYSTEM, CONTROL APPARATUS, AND COMMUNICATION METHOD

(75) Inventors: Masaya Yamagata, Tokyo (JP); Hideyuki Shimonishi, Tokyo (JP); Kentaro Sonoda, Tokyo (JP); Yoichi Hatano, Tokyo (JP); Masayuki Nakae, Tokyo (JP); Yoichiro Morita, Tokyo (JP); Takayuki Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 191 days.

(21) Appl. No.: 14/344,472

(22) PCT Filed: Sep. 12, 2012

(86) PCT No.: PCT/JP2012/073254
§ 371 (c)(1),
(2), (4) Date: Mar. 12, 2014

(87) PCT Pub. No.: WO2013/039083
PCT Pub. Date: Mar. 21, 2013

(65) Prior Publication Data
US 2014/0341019 A1 Nov. 20, 2014

(30) Foreign Application Priority Data
Sep. 13, 2011 (JP) .................................. 2011-199089

(51) Int. Cl.
*H04L 12/26* (2006.01)
*H04L 12/823* (2013.01)
(Continued)

(52) U.S. Cl.
CPC ................ *H04L 47/32* (2013.01); *H04L 47/12* (2013.01); *H04L 47/2441* (2013.01); *H04L 49/3009* (2013.01); *H04L 49/505* (2013.01); *H04L 63/0236* (2013.01); *H04L 63/101* (2013.01)

(58) Field of Classification Search
None
See application file for complete search history.

(56) References Cited

U.S. PATENT DOCUMENTS 5,867,480 A * 2/1999 Thomas ............... H04L 12/5602
370/230
6,073,180 A * 6/2000 Onoda ..................... H04L 67/06
709/230

(Continued)

FOREIGN PATENT DOCUMENTS

JP 2011-166384 A 8/2011
JP 2011-172126 A 9/2011

(Continued)

OTHER PUBLICATIONS

"OpenFlow Switch Specification", Version 1.1.0 Implemented (Wire Protocol 0x02), [searched on Sep. 1, 2011], Internet <URL:http://www.openflow.org/documents/openflow-spec-v1.1.0.pdf>.

(Continued)

*Primary Examiner* — Phirin Sam
(74) *Attorney, Agent, or Firm* — Sughrue Mion, PLLC

(57) ABSTRACT

A communication system includes: a forwarding node(s) in which a first packet handling operation(s) for processing incoming packets is set and which processes packets in accordance with the packet handling operation(s); a first control apparatus setting the first packet handling operation(s) in the forwarding node(s); a flow control node(s) arranged upstream of the forwarding node(s); and a second control apparatus setting a second packet handling operation(s) in the flow control node(s). The flow control node(s) intercepts forwarding of packets that do not satisfy a predetermined condition(s) to the forwarding node(s) in accordance with the second packet handling operation(s).

16 Claims, 11 Drawing Sheets

(51) Int. Cl.
  *H04L 12/801* (2013.01)
  *H04L 12/851* (2013.01)
  *H04L 12/935* (2013.01)
  *H04L 12/931* (2013.01)
  *H04L 29/06* (2006.01)

(56) References Cited

U.S. PATENT DOCUMENTS

| | | | | |
|---|---|---|---|---|
| 8,081,570 | B2* | 12/2011 | Bowes | H04L 1/0072 370/230 |
| 8,127,199 | B2* | 2/2012 | Andersson | H03M 13/15 714/762 |
| 8,787,388 | B1* | 7/2014 | Adams et al. | 370/395.31 |
| 2004/0196792 | A1* | 10/2004 | Davies | H04L 12/5602 370/235 |
| 2005/0105469 | A1* | 5/2005 | Hao | H04L 43/16 370/235 |
| 2005/0213504 | A1* | 9/2005 | Enomoto | H04L 41/142 370/235 |
| 2006/0288411 | A1* | 12/2006 | Garg et al. | 726/22 |
| 2007/0291778 | A1* | 12/2007 | Huang | H04L 1/1614 370/410 |
| 2011/0267942 | A1* | 11/2011 | Aybay | H04L 41/0816 370/230 |
| 2013/0286835 | A1* | 10/2013 | Plamondon | H04L 1/1887 370/235 |
| 2013/0322255 | A1* | 12/2013 | Dillon | H04L 47/22 370/236 |

FOREIGN PATENT DOCUMENTS

| | | |
|---|---|---|
| WO | 2008/095010 A1 | 8/2008 |
| WO | 2011/065227 A1 | 6/2011 |
| WO | 2011/081104 A1 | 7/2011 |

OTHER PUBLICATIONS

Nick McKeown et al., "OpenFlow: Enabling Innovation in Campus Networks", [online], [searched on Sep. 1, 2011], Internet <URL:http://www.openflow.org/documents/openflow-wp-latest.pdf>.

International Search Report for PCT/JP2012/073254 dated Nov. 27, 2012.

* cited by examiner

FIG. 3

| SOURCE | DESTINATION | ACCESS AUTHORITY | CONDITION (OPTION) |
|---|---|---|---|
| 192.168.100.1 | 192.168.0.1 | allow | 80/tcp |
| 192.168.100.2 | 192.168.0.1 | deny | |
| 192.168.0.1 | 192.168.100.1 | allow | |
| .. | .. | .. | .. |

FIG. 4

| MATCHING RULES<br>Match Fields | STATISTICAL<br>INFORMATION<br>Counters | PROCESSING<br>CONTENTS<br>Instructions |
|---|---|---|
| Src IP  Dst IP  TCP/UDP dst port<br>192.168.100.1  192.168.0.1  80 | 0000 | FORWARD TO<br>NEXT HOP |

COMMUNICATION SYSTEM, CONTROL APPARATUS, AND COMMUNICATION METHOD

REFERENCE TO RELATED APPLICATION

This application is a National Stage Entry of PCT/JP2012/073254 filed Sep. 9, 2012, which is based upon and claims the benefit of the priority of Japanese Patent Application No. 2011-199089 filed on Sep. 13, 2011, the disclosures of all of which are incorporated herein in their entirety by reference thereto.

TECHNICAL FIELD

The present invention relates to a communication system, a control apparatus, and a communication method. In particular, it relates to: a communication system in which communication is realized by using a forwarding node(s) processing incoming packets in accordance with control operations by a control apparatus; a control apparatus; and a communication method.

BACKGROUND

In recent years, a technique referred to as OpenFlow has been proposed (see PTL 1 and NPLs 1 and 2). OpenFlow recognizes communications as end-to-end flows and performs path control, failure recovery, load balancing, and optimization on a per-flow basis. An OpenFlow switch (see reference characters 90 to 92 in FIG. 10) according to NPL 2 has a secure channel for communication with an OpenFlow controller (see reference character 93 in FIG. 10) and operates according to a flow table suitably added or rewritten by the OpenFlow controller. In the flow table, a set of the following three is defined for each flow (see FIG. 11): match fields in which contents matched against packet headers are defined (Match Fields); flow statistical information (Counters); and instructions that define processing contents (Instructions).

For example, when an OpenFlow switch receives a packet, the OpenFlow switch searches the flow table for an entry having Match fields that match header information of the incoming packet. If, as a result of the search, the OpenFlow switch finds an entry matching the incoming packet, the OpenFlow switch updates the flow statistical information (Counters) and processes the incoming packet based on processing contents (packet transmission from a specified port, flooding, drop, etc.) written in the Instructions field of the entry. If, as a result of the search, the OpenFlow switch does not find an entry matching the incoming packet, the OpenFlow switch transmits an entry setting request to the OpenFlow controller via the secure channel. Namely, the OpenFlow switch requests the OpenFlow controller to determine a processing content for the incoming packet. The OpenFlow switch receives a flow entry corresponding to the request and updates the flow table. In this way, by using an entry stored in the flow table as a processing rule (packet handling operation), the OpenFlow switch executes packet forwarding.

In addition, PTL 2 discloses a computer system using the above OpenFlow. According to PTL 2, to improve resistance to failure of the system, a plurality of (OpenFlow) controllers are arranged and each of the controllers sets flow entries including respective priorities in OpenFlow switches.

PATENT LITERATURE (PTL)

[PTL 1]
International Publication No. WO2008/095010A1

[PTL 2]
Japanese Patent Kokai Publication No. JP2011-166384A

NON PATENT LITERATURE (NPL)

[NPL 1]
Nick McKeown, and seven others, "OpenFlow: Enabling Innovation in Campus Networks," [online], [searched on Sep. 1, 2011], Internet <URL: http://www.openflow.org/documents/openflow-wp-latest.pdf>

[NPL 2]
"OpenFlow Switch Specification" Version 1.1.0 Implemented (Wire Protocol 0x02) [searched on Sep. 1, 2011], Internet <URL:http://www.openflow.org/documents/openflow-spec-v1.1.0.pdf>

SUMMARY

The following analysis has been given by the present inventors. As illustrated in FIG. 10, OpenFlow in NPL 1 includes edge nodes to which a specified or unspecified number of client nodes such as an OpenFlow Access Point 91 and an OpenFlow-enabled Commercial Switch 92 can be connected. When an edge node receives a packet from a client node, the edge node requests a control apparatus (a Controller 93 in FIG. 10) to set a flow entry (hereinafter also referred to as a "processing rule" or "packet handling operation").

When receiving the flow entry setting request, the control apparatus (the controller 93 in FIG. 10) determines a path from the edge node to a packet destination server, for example. Next, the control apparatus creates flow entries realizing packet forwarding along the determined path and sets the created flow entries in all the forwarding nodes (OpenFlow (switches) 90, the OpenFlow Access Point 91 and the OpenFlow-enabled Commercial Switch 92 in FIG. 10) on the path.

Consequently, if the control apparatus receives a flood of flow entry setting requests, the processing amount of and load on the control apparatus (the controller 93 in FIG. 10) are increased, which causes an increase in delay and a reduction in throughput, counted as a problem. While FIG. 10 illustrates a simplified example, if more client nodes are used, the traffic is increased. Accordingly, not only the load on the forwarding nodes but also the number of flow entry setting requests transmitted to the control apparatus is increased. In addition, if more forwarding nodes are used and the scale of a network is increased, more labor is required for setting and managing flow entries. Consequently, the increase in delay and the reduction in throughput will be more significant.

In the configuration in PTL 2, a plurality of controllers are arranged. However, as illustrated in FIG. 10 of PTL 2, since these controllers operate in a parallel way, this configuration does not provide an effective solution.

It is an object of the present invention to provide: a communication system that can contribute to reduction of the load on the forwarding nodes and the control apparatus and to suppression of an increase in delay and a reduction in throughput; a control apparatus; and a communication method.

According to a first aspect, there is provided a communication system, comprising: a forwarding node(s) in which a first packet handling operation(s) for processing incoming packets is set and which processes packets in accordance with the packet handling operation(s); a first control apparatus setting the first packet handling operation(s) in the forwarding node(s); a flow control node(s) arranged upstream of the forwarding node(s); and a second control apparatus setting a second packet handling operation(s) in the flow control node(s), wherein the flow control node(s) intercepts forwarding of packets that do not satisfy a predetermined condition(s) to the forwarding node(s) in accordance with the second packet handling operation(s).

According to a second aspect, there is provided a second control apparatus in a communication system comprising: a forwarding node(s) in which a first packet handling operation(s) for processing incoming packets is set and which processes packets in accordance with the packet handling operation(s); a first control apparatus setting the first packet handling operation(s) in the forwarding node(s); and a flow control node(s) arranged upstream of the forwarding node(s); wherein the second control apparatus sets a second packet handling operation(s) in the flow control node(s) and causes the flow control node(s) to intercept forwarding of packets that do not satisfy a predetermined condition(s) to the forwarding node(s).

According to a third aspect, there is provided a first control apparatus coordinating with the second control apparatus and setting the first packet handling operation(s) in the forwarding node(s).

According to a fourth aspect, there is provided a communication method, comprising: causing a flow control node(s) to intercept forwarding of packets that do not satisfy a predetermined condition(s) to a forwarding node(s) in accordance with a packet handling operation(s) set by a control apparatus controlling the flow control node(s) itself; and causing a forwarding node(s) arranged downstream of the flow control node(s) to process incoming packets in accordance with a packet handling operation(s) set by a control apparatus controlling the forwarding node(s) itself. This method is tied to a particular machine s, namely, with the flow control node(s) and the forwarding node(s).

The meritorious effects of the present invention are summarized as follows.

According to the present invention, load on a forwarding node(s) and a control apparatus(s) can be reduced and an increase in delay and a reduction in throughput can be suppressed.

BRIEF DESCRIPTION OF DRAWINGS

FIG. 3 illustrates access control policies used in the second exemplary embodiment of the present disclosure.

FIG. 4 illustrates a flow entry generated from an access control policy in FIG. 3 when no flow control nodes are present.

MODES

Figure 1:
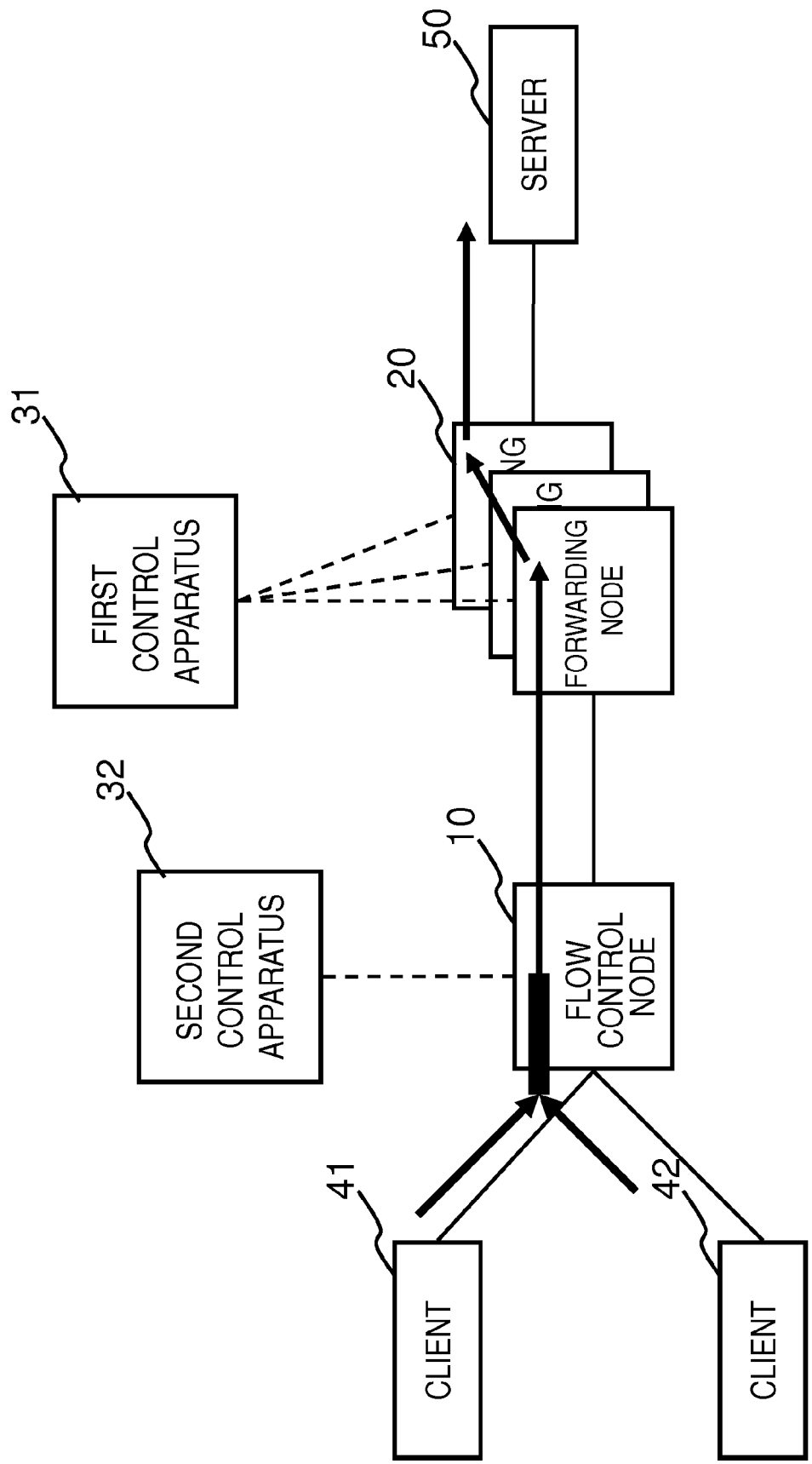
FIG. 1 illustrates a configuration according to a first exemplary embodiment of the present disclosure.

First, an outline of an exemplary embodiment of the present disclosure will be described with reference to the drawings. In the following outline, various components are denoted by reference characters for the sake of convenience. Namely, the following reference characters are merely used as examples to facilitate understanding of the present disclosure, not to limit the present disclosure to the illustrated modes.

An exemplary embodiment of the present disclosure can be realized by a configuration comprising: a forwarding node(s) (20 in FIG. 1) in which a first processing rule(s) for processing incoming packets is set and which processes packets in accordance with the processing rule(s); a first control apparatus (31 in FIG. 1) setting the first processing rule(s) in the forwarding node(s); a flow control node(s) (10 in FIG. 1) arranged upstream of the forwarding node(s); and a second control apparatus (32 in FIG. 1) setting a second processing rule(s) in the flow control node(s).

The second control apparatus (32 in FIG. 1) sets the second processing rule(s) in the flow control node(s) (10 in FIG. 1). Such processing rule(s) includes information (corresponding to conditions set in the above Match Fields) for determining packets to be forwarded to the forwarding node(s) and a processing content(s) for the packets. If the flow control node(s) (10 in FIG. 1) is set not to drop unknown packets, the second control apparatus (32 in FIG. 1) sets a processing rule(s) that includes information for determining packets that are not allowed to be forwarded to the forwarding node(s) and a processing content(s) (drop, forwarding to a node(s) (not illustrated) other than the forwarding node(s), etc.) in the flow control node(s) (10 in FIG. 1).

The flow control node(s) (10 in FIG. 1) forwards packets to the forwarding node(s) in accordance with the second processing rule(s) set by the second control apparatus (32 in FIG. 1). The flow control node(s) (10 in FIG. 1) drops the other packets (interception target packets if applicable) or forwards the other packets to a node(s) other than the forwarding node(s), for example.

As described above, since packets that do not satisfy a predetermined condition(s) (the other packets described above or the packets that need to be dropped) are intercepted by the flow control node(s) (10 in FIG. 1), a flow of packets to the forwarding node(s) (20 in FIG. 1) is reduced. Thus, since the dropped packets do not reach the forwarding node(s), no processing rule setting requests are made for the dropped packets. Therefore, the load on the first control apparatus (31 in FIG. 1) can be reduced. In addition, since the number of processing rule setting requests that need to be handled by the first control apparatus (31 in FIG. 1) is reduced, an increase in delay and a reduction in throughput of the first control apparatus (31 in FIG. 1) is also suppressed.

First Exemplary Embodiment

Next, a first exemplary embodiment of the present disclosure will be described in detail with reference to the drawings. FIG. 1 illustrates a configuration according to the first exemplary embodiment of the present disclosure. As illustrated in FIG. 1, the configuration includes a forwarding node group 20, a first control apparatus 31 controlling the forwarding node group 20, a flow control node 10 that is arranged upstream of the forwarding node group 20 and that receives packets transmitted from clients 41 and 42, a second control apparatus 32 controlling the flow control node 10, and a server 50 serving as a communication destination for the clients 41 and 42.

The clients 41 and 42 are information processing devices such as personal computers or mobile terminals. While FIG. 1 illustrates a single server 50, the configuration may include a plurality of servers 50. The following description will be made assuming that the clients 41 and 42 transmit data transmission request packets to the server 50.

Of the packets transmitted from the clients 41 and 42, the flow control node 10 forwards packets matching a processing rule(s) set by the second control apparatus 32 to the next hop (a forwarding node 20 in FIG. 1). However, the flow control node 10 drops packets that do not satisfy a predetermined condition(s). Such flow control node 10 can be configured by using an OpenFlow switch described in NPLs 1 and 2.

The second control apparatus 32 sets a processing rule(s) (a second processing rule(s) 1) in the flow control node 10. The processing rule(s) includes information (corresponding to conditions set in the above Match Fields) for determining packets that need to be forwarded to the forwarding nodes 20 and processing contents for the packets. In addition, when the flow control node 10 receives unknown packets (packets that do not match any of the processing rules set in its own device), depending on the operation performed, the second control apparatus 32 sets an additional second processing rule(s) (a second processing rule(s) 2) as follows.

If the flow control node 10 is set to transmit a processing rule setting request to the second control apparatus 32 when receiving a packet that does not match any of the processing rules set in its own device, the second control apparatus 32 sets a processing rule (the second processing rule 2) in the flow control node 10, the processing rule including information (corresponding to conditions set in the above Match Fields) for determining packets that need to be dropped and a processing content (drop) for the packets. The information (corresponding to conditions set in the above Match Fields) for determining packets that need to be dropped is set by using wildcards as described in NPL 2 so that fewer fields are matched against the packets. In this way, the load on the flow control node 10 is reduced.

If the flow control node 10 is set to drop packets that do not match any of the processing rules set in its own device, the second control apparatus 32 does not need to set any additional second processing rule (the second processing rule 2). However, if a processing rule setting request needs to be transmitted for certain packets, the second control apparatus 32 can set a processing rule that includes information (corresponding to conditions set in the above Match Fields) for determining packets to which the processing rule setting request is directed and a processing content (transmission of the processing rule setting request) for the packets.

Of the packets forwarded from the clients 41 and 42, the first control apparatus 31 determines a forwarding path for packets that need to be forwarded to the server 50. In addition the first control apparatus 31 sets a processing rule(s) (a first processing rule(s)) that causes the forwarding nodes 20 on the path to forward packets along the forwarding path. As described above, since the forwarding nodes 20 only receive the packets that have passed through the flow control node 10, it is not necessary to set processing rules for causing the forwarding nodes 20 to perform packet dropping or the like. In addition, since the forwarding nodes 20 receives only the packets on which matching processing has already been completed with the second processing rule(s) (the second processing rule(s) 1) by the flow control node 10, matching processing on the items that have already been matched in the flow control node 10 can be omitted when the forwarding nodes 20 perform matching processing between an incoming packet and a processing rule(s). Thus, the first control apparatus 31 can set processing rules that enable reduction of load on the forwarding nodes 20 for matching processing between an incoming packet and a processing rule(s).

The forwarding node group 20 processes packets forwarded from the flow control node 10 in accordance with a processing rule(s) (the first processing rule(s)) set by the first control apparatus 31. Each of these forwarding nodes 20 can be configured by using an OpenFlow switch described in NPLs 1 and 2.

As described above, of the packets forwarded from the clients 41 and 42, the packets that do not satisfy a predetermined condition(s) are dropped by the flow control node 10, as illustrated by arrows in FIG. 1. Since it is only necessary for the forwarding nodes 20 to handle the packets that have passed through the flow control node 10, the load on the first control apparatus 31 controlling the forwarding nodes 20 is reduced. In addition, since the processing load on the first control apparatus 31 is reduced by at least the number of packets that have not passed through the flow control node 10, an increase in delay and a reduction in throughput is suppressed.

While the above advantageous effects are more significant when more packets are inputted to the flow control node 10 and more packets are dropped by the flow control node 10, the load on the flow control node 10 is increased. For example, it is effective to reduce the number of processing rules set in the flow control node 10 (at least, fewer than the number of first processing rules stored in a forwarding node 20) or to set a processing rule having fewer fields that are matched against an incoming packet in the flow control node 10 (at least, fewer than the number of fields of the first processing rule set in the forwarding node 20 that are matched against an incoming packet).

In addition, in order to reduce the number of processing rules stored in the flow control node 10 and the forwarding nodes 20 and to reduce the load thereon, it is also effective to set valid periods for the first and second processing rules so that the flow control node 10 and the forwarding nodes 20 can delete expired processing rules. In such cases, different valid periods may be set for the second processing rules set in the flow control node 10 and the first processing rules set in the forwarding nodes 20. However, if processing rules are deleted, processing rule setting requests are transmitted to the first and second control apparatuses. Thus, an increase of the load on the first and second control apparatuses also needs to be taken into consideration. For example, it is possible to set a longer valid period for a second processing rule(s) set in the flow control node 10 than a valid period for a first processing rule(s) set in a forwarding node(s) 20. In this way, since the flow reduction effect is maintained by the second processing rule(s) not deleted for a longer period, the increase of the load on both the first control apparatus 31 and the second control apparatus 32 can be suppressed.

Second Exemplary Embodiment

Figure 2:
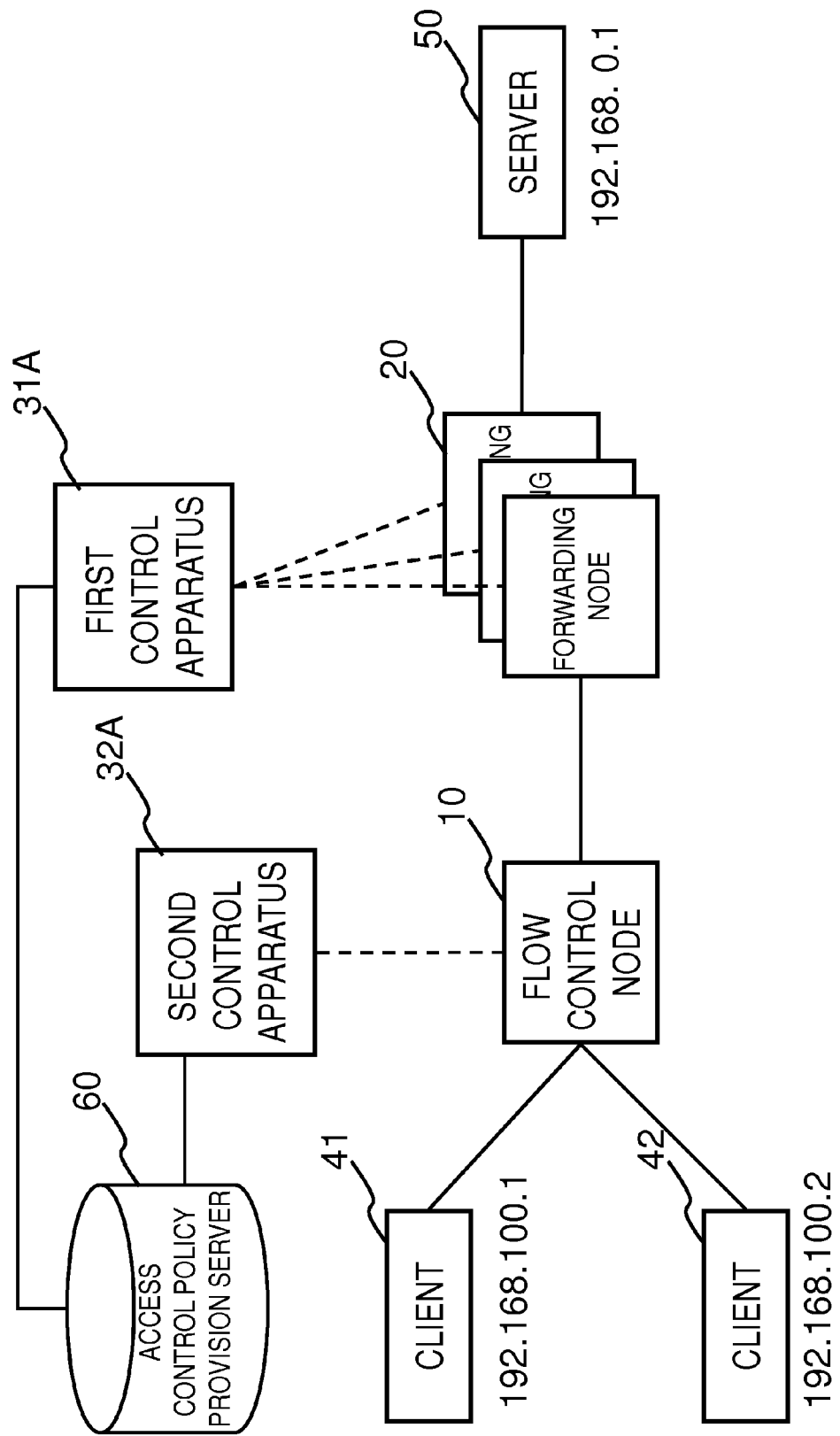
FIG. 2 illustrates a configuration according to a second exemplary embodiment of the present disclosure.

Next, a second exemplary embodiment of the present disclosure will be described in detail with reference to the drawings. In the second exemplary embodiment, the above first and second control apparatuses operate in coordination with each other. FIG. 2 illustrates a configuration according to the second exemplary embodiment of the present disclosure. The second exemplary embodiment differs from the first exemplary embodiment illustrated in FIG. 1 in that an access control policy provision server 60 is added and first and second control apparatuses 31A and 32A, respectively, can refer to access control policies stored in the access control policy provision server 60. Since other components are the same as those in the first exemplary embodiment, the following description will be made with a focus on the difference.

The access control policy provision server 60 is configured with a device storing policies for performing access control such as access to the server 50 based on authorities given to the clients 41 and 42 or users thereof.

FIG. 3 illustrates access control policies stored in the access control policy provision server 60. In this example in FIG. 2, access from the client 41 (IP address=192.168.100) to the server 50 (IP address=192.168.0.1) is allowed (allow) on condition that TCP port number 80 is used. However, access from the client 42 (IP address=192.168.100.2) to the server 50 (IP address=192.168.0.1) is denied (deny).

FIG. 4 illustrates a processing rule generated from an access control policy in FIG. 3 when the flow control node 10 is not present. For example, to determine packets addressed to the server 50 (IP address=192.168.0.1) from the client 41 (IP address=192.168.100.1), a processing rule including match fields specifying a source IP address (Src IP)=192.168.100.1, a destination IP address (Dst IP)=192.168.0.1, and a TCP port number (TCP/UDP dst port)=80 is set. In addition, the processing rule includes a processing content defining forwarding to the next hop. Each time a packet that does not exactly match the above match fields is received, a processing rule setting request is transmitted to the control apparatus.

Figure 5:
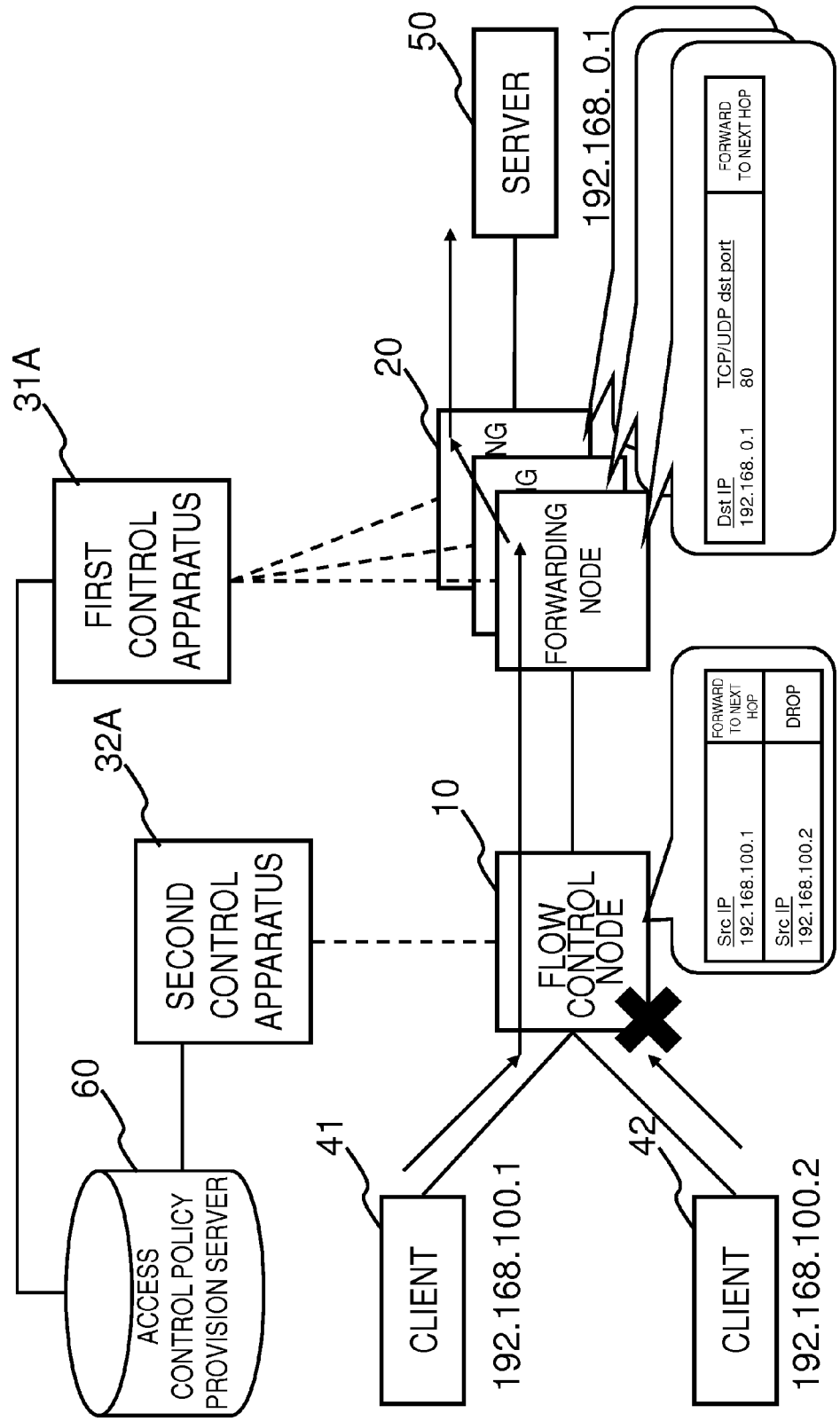
FIG. 5 is a diagram for illustrating flow entries set in respective nodes according to the second exemplary embodiment of the present disclosure.

However, according to the present exemplary embodiment, as illustrated in FIG. 5, a processing rule for forwarding packets including a source IP address (Src IP)=192.168.100.1 to a forwarding node 20 and a processing rule for dropping packets including a source IP address (Src IP)=192.168.100.2 are set in the flow control node 10. Thus, the flow control node 10 drops the packets transmitted from the client 42.

In addition, according to the present exemplary embodiment, a processing rule for forwarding packets including a destination IP address (Dst IP)=192.168.0.1 and a TCP port number (TCP/UDP dst port)=80 to the next hop is set in the forwarding nodes 20. Namely, the first control apparatus 31A does not need to set a processing rule for processing packets transmitted from the client 42 in the forwarding nodes 20. In addition, with this processing rule, the forwarding nodes 20 can omit matching processing regarding the source IP address (Src IP) for the packets transmitted from the client 41.

As described above, according to the present exemplary embodiment, the flow control node 10 arranged upstream can be configured to perform packet dropping based on the access control policies and the forwarding nodes 20 can be configured to perform packet forwarding according to the matching rules having the match fields with lighter search load. As a result, since the load on the forwarding nodes 20 and the first control apparatus 31A can be reduced, an increase in delay and a reduction in throughput can be prevented.

Third Exemplary Embodiment

Figure 6:
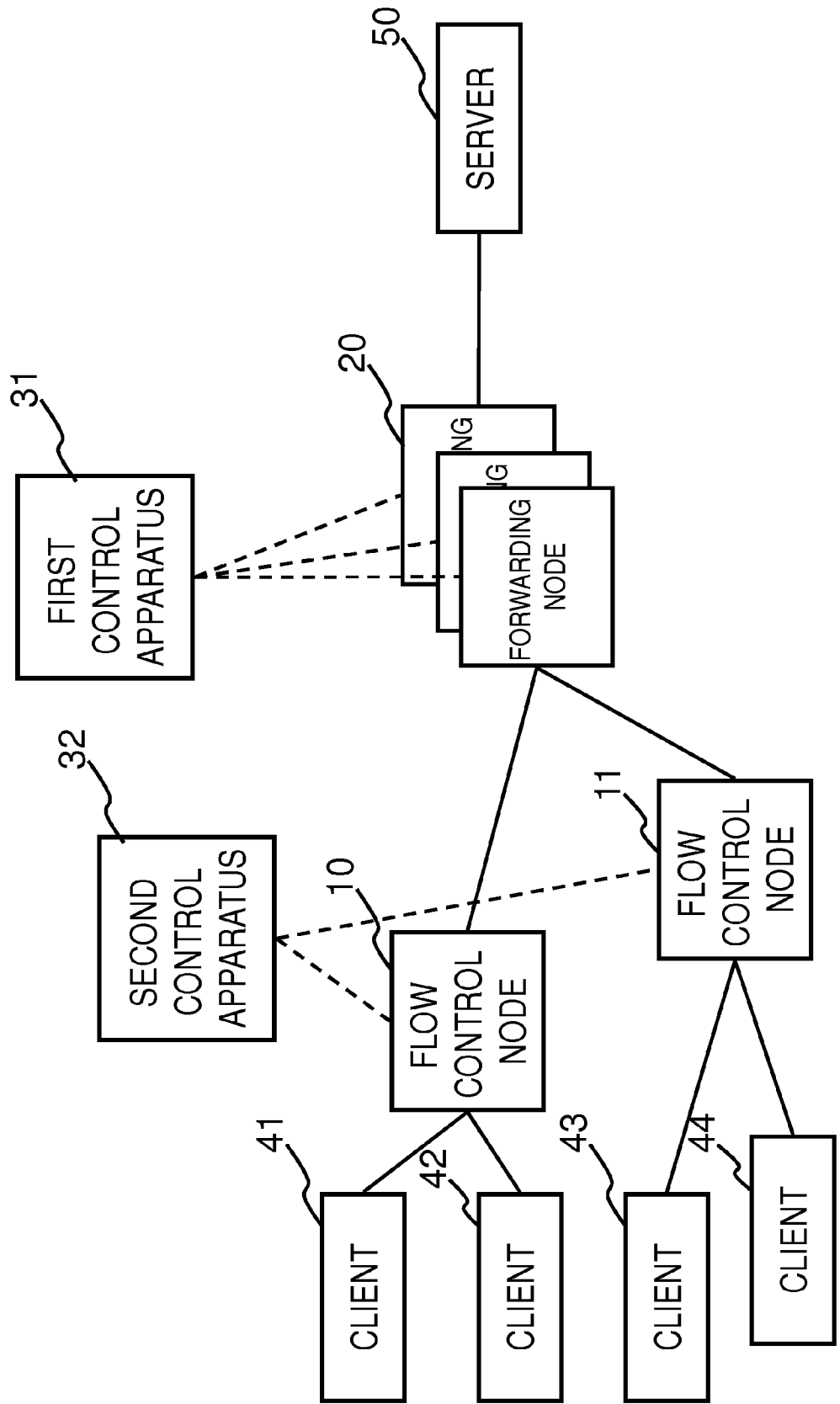
FIG. 6 illustrates a configuration according to a third exemplary embodiment of the present disclosure.

Next, a third exemplary embodiment of the present disclosure will be described in detail with reference to the drawings. In the third exemplary embodiment, a plurality of flow control nodes 10/11 are arranged in parallel with each other. FIG. 6 illustrates a configuration according to the third exemplary embodiment of the present disclosure. The third exemplary embodiment differs from the first exemplary embodiment illustrated in FIG. 1 in that a flow control node 11 receiving packets transmitted from clients 43 and 44 is added. Since other components are the same as those in the first exemplary embodiment, the following description will be made with a focus on the difference.

A basic operation of the flow control node 11 is the same as that of the flow control node 10. Namely, of the packets transmitted from the clients 43 and 44, the flow control node 11 forwards packets that match a processing rule(s) set by the second control apparatus 32 to the next hop and drops packets that do not satisfy a predetermined condition(s).

Without such flow control node, the number of packets received by the forwarding nodes 20 is twice as many as the number of packets received by the forwarding nodes 20 in the first exemplary embodiment illustrated in FIG. 1. However, according to the present exemplary embodiment, since the flow control nodes 10 and 11 drop packets that do not satisfy respective predetermined conditions, the load on the forwarding nodes 20 and the first control apparatus 31 can be reduced.

Fourth Exemplary Embodiment

Figure 7:
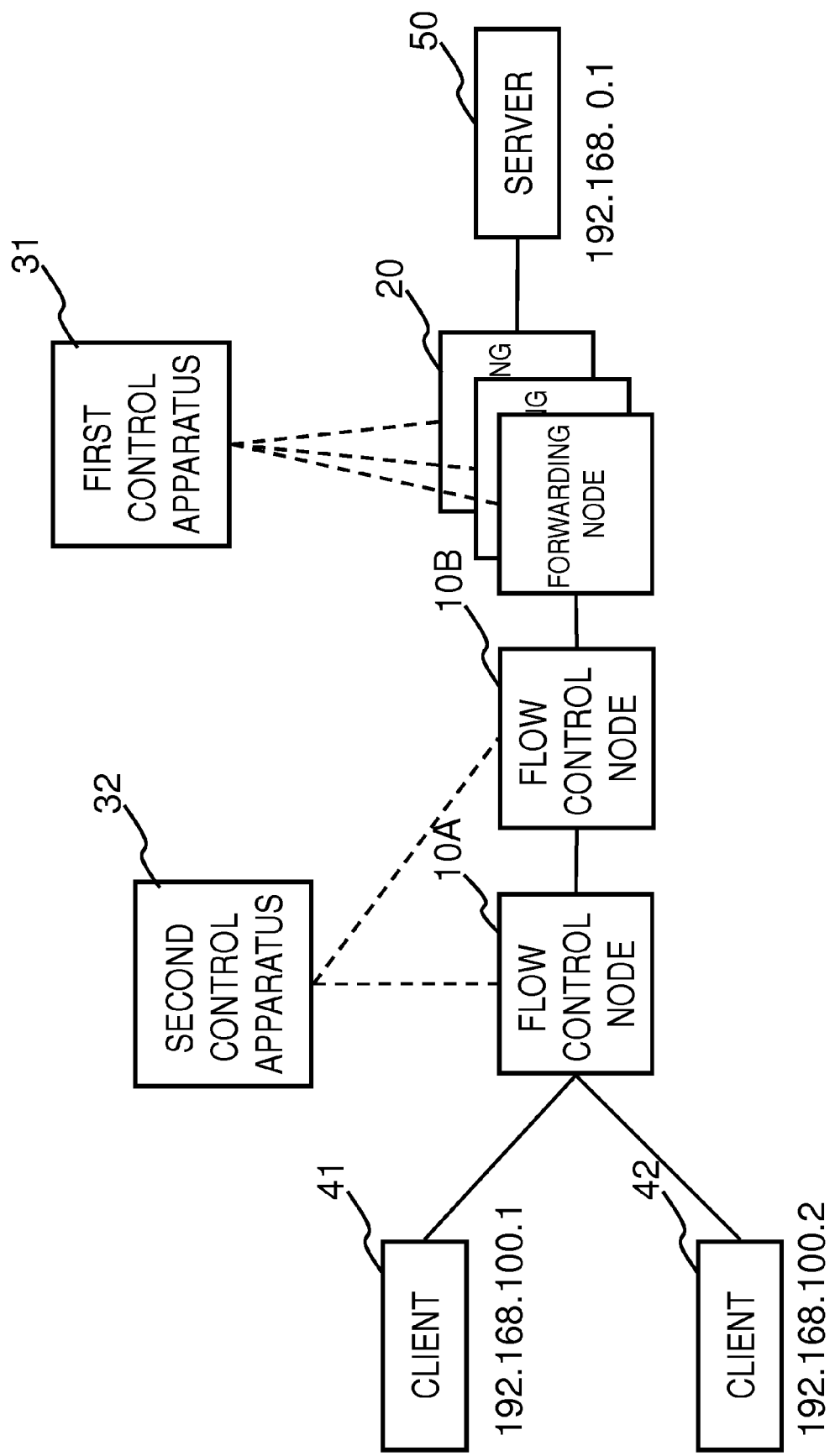
FIG. 7 illustrates a configuration according to a fourth exemplary embodiment of the present disclosure.

Next, a fourth exemplary embodiment of the present disclosure will be described in detail with reference to the drawings. In the fourth exemplary embodiment, a plurality of flow control nodes 10 are arranged in series with each other. FIG. 7 illustrates a configuration according to the fourth exemplary embodiment of the present disclosure. The fourth exemplary embodiment differs from the first exemplary embodiment illustrated in FIG. 1 in that two flow control nodes 10A and 10B are arranged in series with each other between the pair of clients 41 and 42 and the forwarding node group 20. Since other components are the same as those in the first exemplary embodiment, the following description will be made with a focus on the difference.

Figure 8:
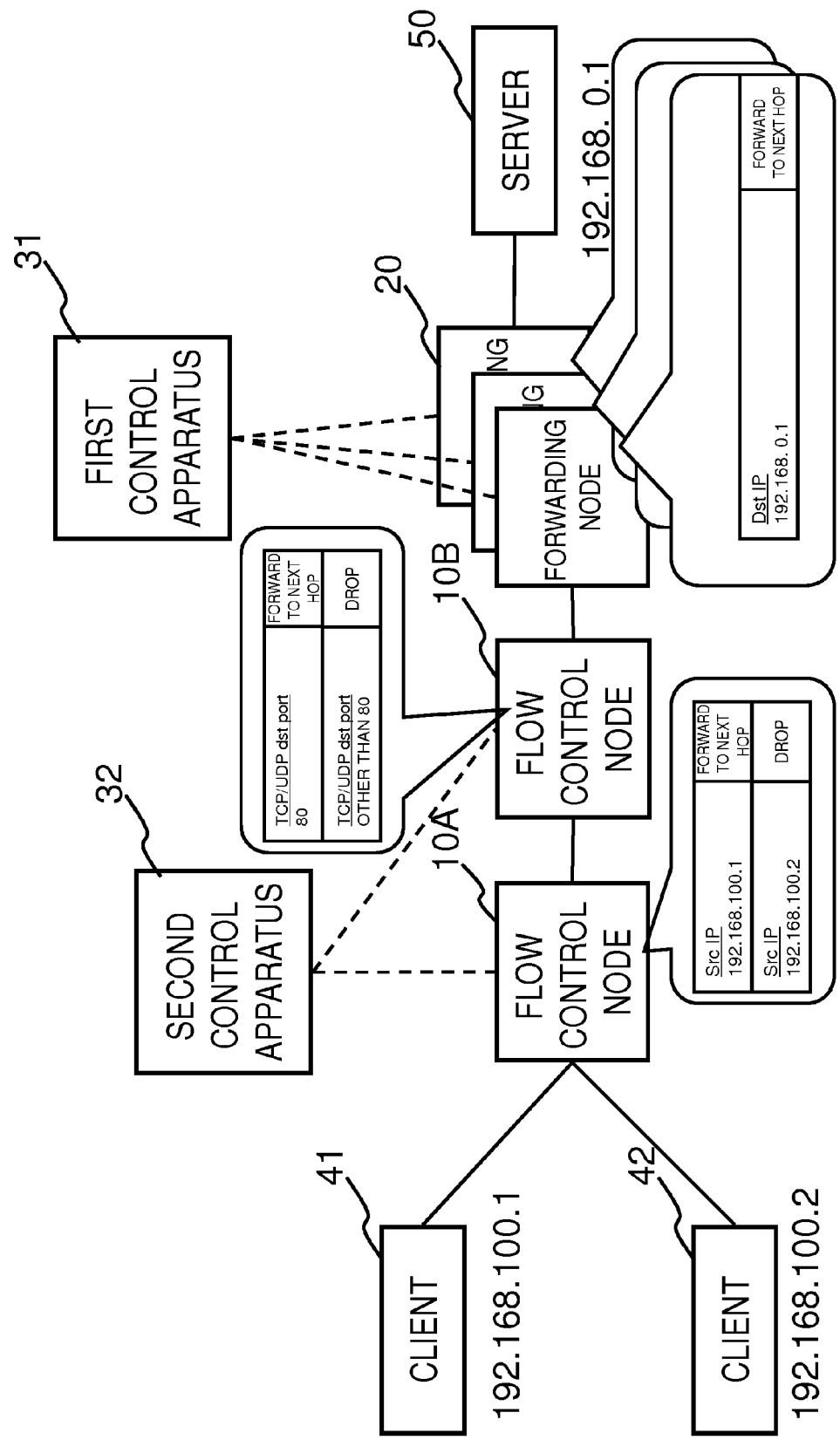
FIG. 8 is a diagram for illustrating flow entries set in respective nodes according to the fourth exemplary embodiment of the present disclosure.

The present exemplary embodiment is effective when many packets are transmitted from the clients 41 and 42. For example, as illustrated in FIG. 8, a processing rule for forwarding packets including a source IP address (Src IP)=192.168.100.1 to a forwarding node 20 and a processing rule for dropping packets including a source IP address (Src IP)=192.168.100.2 are set in the first-stage flow control node 10A. Accordingly, the first-stage flow control node 10A drops the packets transmitted from the client 42.

In addition, as illustrated in FIG. 8, a processing rule for forwarding packets including a TCP port number (TCP/UDP dst port)=80 to a forwarding node 20 and a processing rule for dropping packets including a TCP port number (TCP/UDP dst port)≠80 are set in the second-stage flow control node 10A. Accordingly, the second-stage flow control node 10B narrows down the packets transmitted from the client 41.

As a result, a processing rule for matching processing only regarding a destination IP address (Dst IP)=192.168.0.1. can be set in the forwarding nodes 20.

Thus, according to the present exemplary embodiment, the flow control nodes 10A and 10B are caused to perform further narrow-down processing on the packets so that the processing amount of the packet matching performed by the forwarding nodes 20 can be reduced. In addition, as a result, since the load on the forwarding nodes 20 and the first control apparatus 31 can be reduced, an increase in delay and a reduction in throughput can be prevented. In addition, in the example in FIG. 7, the two flow control nodes 10A and 10B are arranged in series with each other. However, alternatively, a plurality of flow control nodes may be arranged at each of a plurality of stages. For example, one or a plurality of the flow control nodes may be arranged at the first stage and a plurality of second-stage flow control nodes may be arranged for further narrowing down the packets forwarded from the first-stage flow control node(s).

Fifth Exemplary Embodiment

Figure 9:
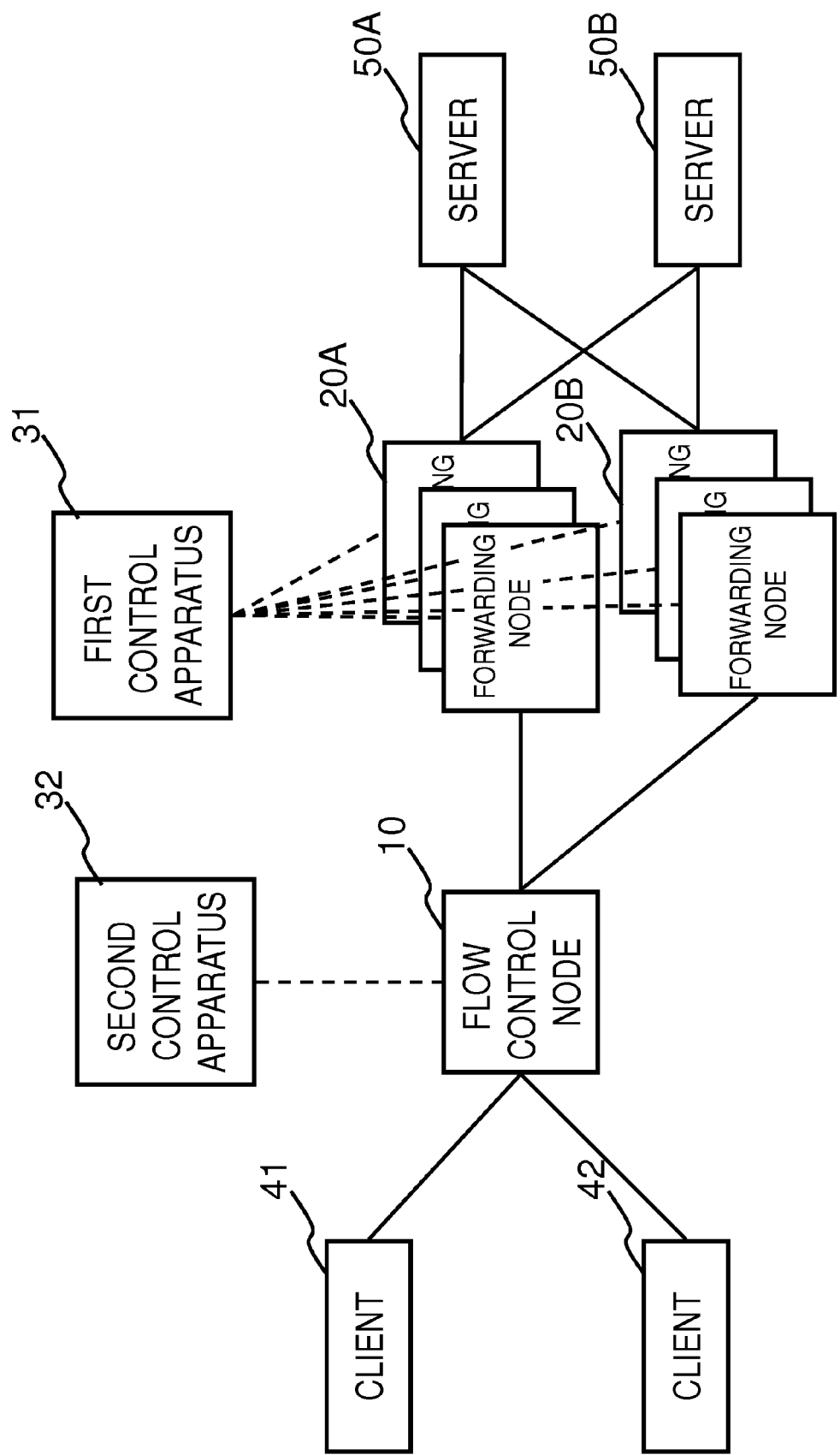
FIG. 9 illustrates a configuration according to a fifth exemplary embodiment of the present disclosure.
Figure 10:
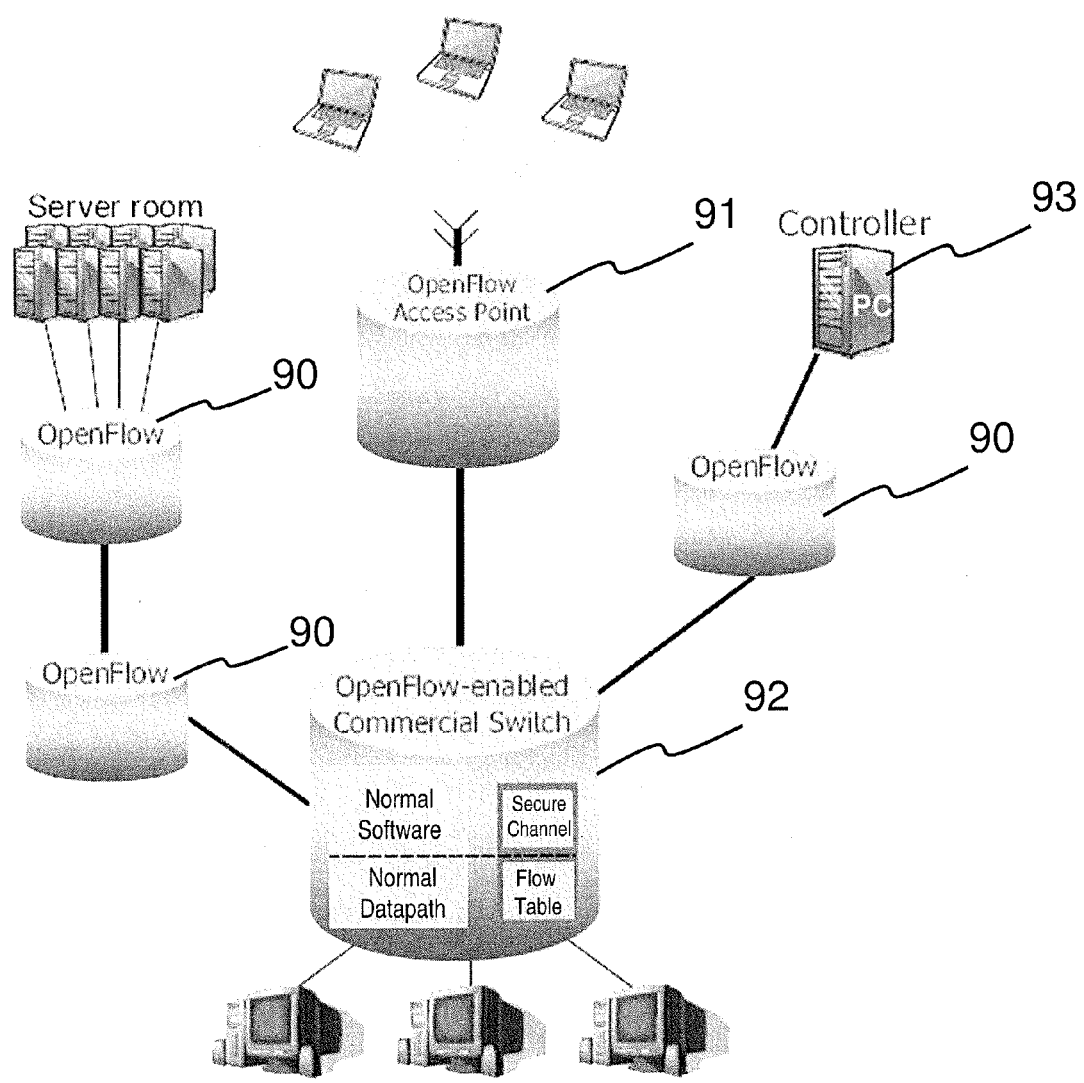
FIG. 10 illustrates a network configuration disclosed in NPL 1.
Figure 11:
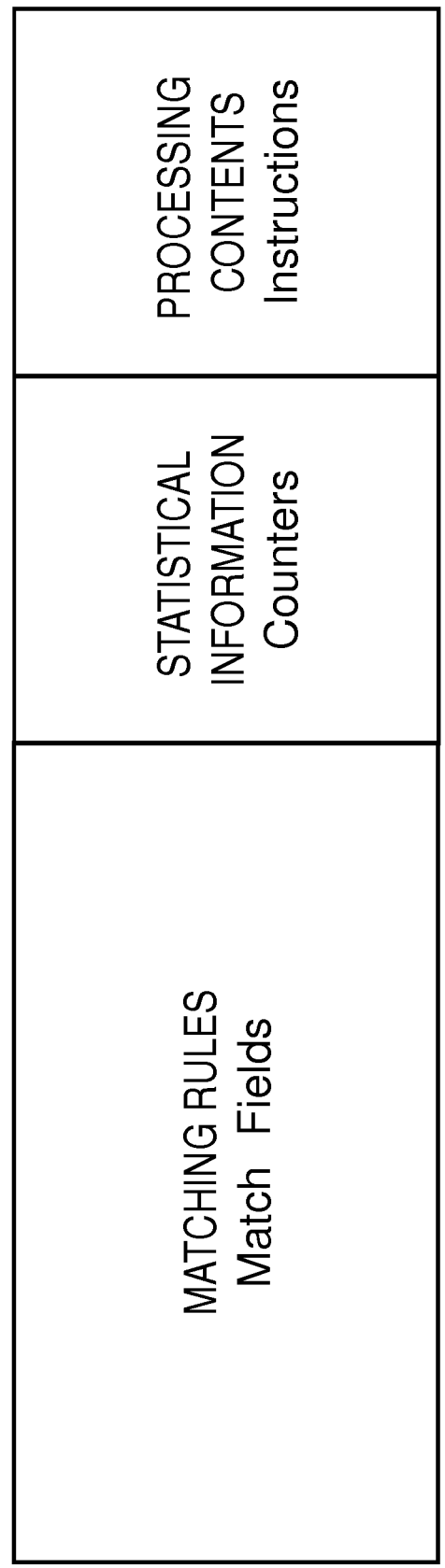
FIG. 11 illustrates a configuration of a flow entry stored in an OpenFlow switch in NPL 2.

Next, a fifth exemplary embodiment of the present disclosure will be described in detail with reference to the drawings. In the fifth exemplary embodiment, the flow control node 10 sorts out the packets. FIG. 9 illustrates a configuration according to the fifth exemplary embodiment of the present disclosure. The fifth exemplary embodiment differs from the first exemplary embodiment illustrated in FIG. 1 in that forwarding node groups 20A and 20B are connected to the flow control node 10 and in that the forwarding node groups 20A and 20B are connected to servers 50A and 50B. Since other components are the same as those in the first exemplary embodiment, the following description will be made with a focus on the difference.

In the present exemplary embodiment, the second control apparatus 32 sets processing rules in the flow control node 10. These processing rules define to which one of the forwarding node groups 20A and 20B packets need to be forwarded. For example, the second control apparatus 32 sets processing rules so that, of the packets transmitted from the client 41, packets addressed to the server 50A are forwarded to the forwarding nodes 20A and packets addressed to the server 50B are dropped. Likewise, of the packets transmitted from the client 42, packets addressed to the server 50B are forwarded to the forwarding nodes 20B and packets addressed to the server 50A are dropped.

As described above, even if two or more forwarding nodes are connected to a single flow control node, the present disclosure is applicable without problem.

While exemplary embodiments of the present disclosure have thus been described, the present disclosure is not limited thereto. Further variations, substitutions, or adjustments can be made without departing from the basic technical concept of the present disclosure. For example, the number of clients, flow control nodes, forwarding nodes, and servers and the connection configurations described in each of the above exemplary embodiments are merely used to facilitate the description of the present disclosure. Namely, these numbers and connection configurations can be changed as needed.

In addition, in each of the above exemplary embodiments, a flow control node(s) is configured to perform packet dropping. However, alternatively, if a packet does not satisfy a predetermined condition(s), a flow control node(s) may write information indicating that the packet needs to be dropped in a predetermined region of the packet, and a forwarding node may drops the packet in which the information indicating that the packet needs to be dropped is written. In such case, the second control apparatus sets a processing rule for causing the flow control node to write the information indicating that a packet that does not satisfy a predetermined condition(s) needs to be dropped in a predetermined region of the packet. In addition, the first control apparatus sets a processing rule for causing the forwarding nodes to drop a packet in which the information indicating that the packet needs to be dropped is written. This configuration can also reduce the number of processing rule setting requests transmitted from the forwarding nodes to the first control apparatus and suppress an increase in delay and a reduction in throughput of the first control apparatus.

In addition, the processing rules described in each of the exemplary embodiments are merely used to facilitate the description of the present disclosure. Namely, processing rules including more and more detailed match fields may be used. For example, as described in NPL 2, more complex access control may be performed by using an ingress port, a MAC address value or a VLAN ID value.

Finally, preferred modes of the present disclosure will be summarized.

Mode 1

(Refer to the communication system according to the first aspect.)

Mode 2

In the communication system of Mode 1, the flow control node(s) intercepts forwarding of the packets that do not satisfy a predetermined condition(s) to the forwarding node(s) by dropping the packets that do not satisfy a predetermined condition(s) or by forwarding the packets to a node(s) other than the forwarding node(s).

Mode 3

In the communication system of Mode 1 or 2, the second control apparatus sets a processing rule(s) having fewer fields that are matched against incoming packets in the flow control node(s), compared with a processing rule(s) set in the forwarding node(s).

Mode 4

In the communication system of any one of Modes 1 to 3; the second control apparatus sets fewer processing rules than processing rules set in the forwarding node(s) in the flow control node(s).

Mode 5

In the communication system of any one of Modes 1 to 4; the second control apparatus sets a processing rule(s) having a longer valid period(s) in the flow control node(s) than a valid period(s) of a processing rule(s) set in the forwarding node(s).

Mode 6

In the communication system of any one of Modes 1 to 5; the first and second control apparatus refer to a predetermined access control policy(ies) and set a processing rule(s) for realizing access control corresponding to the access control policy(ies) in the flow control node(s) or the forwarding node(s).

Mode 7

In the communication system of any one of Modes 1 to 6; a plurality of flow control nodes are arranged in series with each other; and wherein the second control apparatus sets the second processing rule(s) so that packets are dropped in stages by the individual flow control nodes.

Mode 8

In the communication system of any one of Modes 2 to 7; the second control apparatus sets a second processing rule(s) for causing, if the flow control node(s) receives a packet that does not satisfy a predetermined condition(s), the flow control node(s) to write information indicating that the packet needs to be dropped in a predetermined region of the packet, instead of causing the flow control node(s) to drop the packet or forward the packet to a node(s) other than the forwarding node(s);

the flow control node(s) writes the information indicating that the packet needs to be dropped in the predetermined region of the packet that does not satisfy a predetermined condition(s) in accordance with the second processing rule(s) and forwards the packet to the forwarding node(s); and the first control apparatus sets a processing rule(s) for causing the forwarding node(s) to drop the packet in which the information indicating that the packet needs to be dropped is written.

Mode 9
(Refer to the second control apparatus according to the second aspect.)
Mode 10
In the second control apparatus of Mode 9;
the second control apparatus sets the second processing rule(s) so that the flow control node(s) is caused to drop the packets that do not satisfy a predetermined condition(s) or forward the packets to a node(s) other than the forwarding node(s).
Mode 11
In the second control apparatus of Mode 9 or 10;
the second control apparatus sets a processing rule(s) having fewer fields that are matched against incoming packets in the flow control node(s), compared with a processing rule(s) set in the forwarding node(s).
Mode 12
In the second control apparatus of any one of Modes 9 to 11;
the second control apparatus sets fewer processing rules than processing rules set in the forwarding node(s) in the flow control node(s).
Mode 13
In the second control apparatus of any one of Modes 9 to 12;
the second control apparatus sets a processing rule(s) having a longer valid period(s) than a valid period(s) of a processing rule(s) set in the forwarding node(s) in the flow control node(s).
Mode 14
In the second control apparatus of any one of Modes 9 to 13;
the second control apparatus refers to a predetermined access control policy(ies) and sets a processing rule(s) for realizing access control corresponding to the access control policy(ies) in the flow control node(s).
Mode 15
In the second control apparatus of any one of Modes 9 to 14;
wherein the second control apparatus sets the second processing rule(s) so that packets are dropped in stages by a plurality of flow control nodes arranged in series with each other.
Mode 16
(Refer to the first control apparatus according to the third aspect.)
Mode 17
(Refer to the communication method according to the fourth aspect.)
Mode 18
In the communication method of Mode 17;
comprising, instead of causing the flow control node(s) to intercept forwarding of packets that do not satisfy a predetermined condition(s) to a forwarding node(s) in accordance with a processing rule(s) set by a control apparatus controlling the flow control node(s):
causing, if the flow control node(s) receives a packet that does not satisfy a predetermined condition(s), the flow control node(s) to write information indicating that the packet needs to be dropped in a predetermined region of the packet or causing the flow control node(s) to forward the packet to the forwarding node(s) in accordance with a processing rule(s) set by a control apparatus controlling the flow control node(s); and
causing the forwarding node(s) to drop the packet in which the information indicating that the packet needs to be dropped is written. Further, Modes 18 can be developed into derivative modes as Modes 2 to 7.

The disclosure of the above PTLs is incorporated herein by reference thereto.
Modifications and adjustments of the exemplary embodiments and examples are possible within the scope of the overall disclosure (including the claims and the drawings) of the present invention and based on the basic technical concept of the present invention. Various combinations and selections of various disclosed elements (including each element in each claim, example, drawing, etc.) are possible within the scope of the claims and the drawings of the present invention. That is, the present invention of course includes various variations and modifications that could be made by those skilled in the art according to the overall disclosure including the claims and the technical concept. The present description discloses numerical value ranges. However, even if the description does not particularly disclose arbitrary numerical values or small ranges included in the ranges, these values and ranges should be deemed to have been specifically disclosed.

REFERENCE SIGNS LIST

10, 11, 10A, 10B flow control node
20, 20A, 20B forwarding node (group)
31, 31A first control apparatus
32, 32A second control apparatus
41 to 44 client
50, 50A, 50B server
60 access control policy provision server

What is claimed is:
1. A communication system, comprising:
a forwarding node(s) in which a first packet handling operation(s) for processing incoming packets is set and which processes packets in accordance with the packet handling operation(s);
a first control apparatus setting the first packet handling operation(s) in the forwarding node(s);
a flow control node(s) arranged upstream of the forwarding node(s); and
a second control apparatus setting a second packet handling operation(s) in the flow control node(s),
wherein the flow control node(s) intercepts forwarding of packets that do not satisfy a predetermined condition(s) to the forwarding node(s) in accordance with the second packet handling operation(s); and
wherein the second control apparatus sets a packet handling operation(s) having fewer fields that are matched against incoming packets in the flow control node(s), compared with a packet handling operation(s) set in the forwarding node(s).
2. The communication system according to claim 1;
wherein a plurality of flow control nodes are arranged in series with each other; and
wherein the second control apparatus sets the second packet handling operation(s) so that packets are dropped in stages by the individual flow control nodes.
3. A communication system, comprising:
a forwarding node(s) in which a first packet handling operation(s) for processing incoming packets is set and which processes packets in accordance with the packet handling operation(s);
a first control apparatus setting the first packet handling operation(s) in the forwarding node(s);
a flow control node(s) arranged upstream of the forwarding node(s); and
a second control apparatus setting a second packet handling operation(s) in the flow control node(s), wherein the flow control node(s) intercepts forwarding of packets that do not satisfy a predetermined condition(s) to the forwarding node(s) in accordance with the second packet handling operation(s); and wherein the second control apparatus sets fewer packet handling operations than packet handling operations set in the forwarding node(s) in the flow control node(s).

4. The communication system according to claim 3;
wherein a plurality of flow control nodes are arranged in series with each other; and
wherein the second control apparatus sets the second packet handling operation(s) so that packets are dropped in stages by the individual flow control nodes.

5. A communication system, comprising:
a forwarding node(s) in which a first packet handling operation(s) for processing incoming packets is set and which processes packets in accordance with the packet handling operation(s);
a first control apparatus setting the first packet handling operation(s) in the forwarding node(s);
a flow control node(s) arranged upstream of the forwarding node(s); and
a second control apparatus setting a second packet handling operation(s) in the flow control node(s),
wherein the flow control node(s) intercepts forwarding of packets that do not satisfy a predetermined condition(s) to the forwarding node(s) in accordance with the second packet handling operation(s); and
wherein the second control apparatus sets a packet handling operation(s) having a longer valid period(s) in the flow control node(s) than a valid period(s) of a packet handling operation(s) set in the forwarding node(s).

6. The communication system according to claim 5;
wherein a plurality of flow control nodes are arranged in series with each other; and
wherein the second control apparatus sets the second packet handling operation(s) so that packets are dropped in stages by the individual flow control nodes.

7. A communication system, comprising:
a forwarding node(s) in which a first packet handling operation(s) for processing incoming packets is set and which processes packets in accordance with the packet handling operation(s);
a first control apparatus setting the first packet handling operation(s) in the forwarding node(s);
a flow control node(s) arranged upstream of the forwarding node(s); and
a second control apparatus setting a second packet handling operation(s) in the flow control node(s),
wherein the flow control node(s) intercepts forwarding of packets that do not satisfy a predetermined condition(s) to the forwarding node(s) in accordance with the second packet handling operation(s);
wherein the flow control node(s) intercepts forwarding of the packets that do not satisfy a predetermined condition(s) to the forwarding node(s) by dropping the packets that do not satisfy a predetermined condition(s) or by forwarding the packets to a node(s) other than the forwarding node(s);
wherein the second control apparatus sets a second packet handling operation(s) for causing, if the flow control node(s) receives a packet that does not satisfy a predetermined condition(s), the flow control node(s) to write information indicating that the packet needs to be dropped in a predetermined region of the packet, instead of causing the flow control node(s) to drop the packet or forward the packet to a node(s) other than the forwarding node(s);
wherein the flow control node(s) writes the information indicating that the packet needs to be dropped in the predetermined region of the packet that does not satisfy a predetermined condition(s) in accordance with the second packet handling operation(s) and forwards the packet to the forwarding node(s); and
wherein the first control apparatus sets a packet handling operation(s) for causing the forwarding node(s) to drop the packet in which the information indicating that the packet needs to be dropped is written.

8. A second control apparatus in a communication system comprising:
a forwarding node(s) in which a first packet handling operation(s) for processing incoming packets is set and which processes packets in accordance with the packet handling operation(s);
a first control apparatus setting the first packet handling operation(s) in the forwarding node(s); and
a flow control node(s) arranged upstream of the forwarding node(s);
wherein the second control apparatus sets a second packet handling operation(s) in the flow control node(s) and causes the flow control node(s) to intercept forwarding of packets that do not satisfy a predetermined condition(s) to the forwarding node(s); and
wherein the second control apparatus sets a packet handling operation(s) having fewer fields that are matched against incoming packets in the flow control node(s), compared with a packet handling operation(s) set in the forwarding node(s).

9. The second control apparatus according to claim 8;
wherein the second control apparatus sets the second packet handling operation(s) so that packets are dropped in stages by a plurality of flow control nodes arranged in series with each other.

10. A second control apparatus in a communication system comprising:
a forwarding node(s) in which a first packet handling operation(s) for processing incoming packets is set and which processes packets in accordance with the packet handling operation(s);
a first control apparatus setting the first packet handling operation(s) in the forwarding node(s); and
a flow control node(s) arranged upstream of the forwarding node(s);
wherein the second control apparatus sets a second packet handling operation(s) in the flow control node(s) and causes the flow control node(s) to intercept forwarding of packets that do not satisfy a predetermined condition(s) to the forwarding node(s); and
wherein the second control apparatus sets fewer packet handling operations than packet handling operations set in the forwarding node(s) in the flow control node(s).

11. The second control apparatus according to claim 10;
wherein the second control apparatus sets the second packet handling operation(s) so that packets are dropped in stages by a plurality of flow control nodes arranged in series with each other.

12. A second control apparatus in a communication system comprising:
a forwarding node(s) in which a first packet handling operation(s) for processing incoming packets is set and which processes packets in accordance with the packet handling operation(s);

a first control apparatus setting the first packet handling operation(s) in the forwarding node(s); and a flow control node(s) arranged upstream of the forwarding node(s);

wherein the second control apparatus sets a second packet handling operation(s) in the flow control node(s) and causes the flow control node(s) to intercept forwarding of packets that do not satisfy a predetermined condition(s) to the forwarding node(s);

wherein the second control apparatus sets a packet handling operation(s) having a longer valid period(s) than a valid period(s) of a packet handling operation(s) set in the forwarding node(s) in the flow control node(s).

13. The second control apparatus according to claim 12;

wherein the second control apparatus sets the second packet handling operation(s) so that packets are dropped in stages by a plurality of flow control nodes arranged in series with each other.

14. A communication method, comprising:

causing a forwarding node(s) to set a first packet handling operation(s) for processing incoming packets and to process packets in accordance with the packet handling operation(s);

causing a first control apparatus to set the first packet handling operation(s) in the forwarding node(s);

wherein a flow control node(s) intercepts forwarding of packets that do not satisfy a predetermined condition(s) to the forwarding node(s) in accordance with a second packet handling operation(s) set by a second control apparatus; and wherein the second control apparatus sets a packet handling operation(s) having fewer fields that are matched against incoming packets in the flow control node(s), compared with a packet handling operation(s) set in the forwarding node(s).

15. A communication method, comprising:

causing a forwarding node(s) to set a first packet handling operation(s) for processing incoming packets and to process packets in accordance with the packet handling operation(s);

causing a first control apparatus to set the first packet handling operation(s) in the forwarding node(s);

wherein a flow control node(s) intercepts forwarding of packets that do not satisfy a predetermined condition(s) to the forwarding node(s) in accordance with a second packet handling operation(s) set by a second control apparatus; and wherein the second control apparatus sets fewer packet handling operations than packet handling operations set in the forwarding node(s) in the flow control node(s).

16. A communication method, comprising:

causing a forwarding node(s) to set a first packet handling operation(s) for processing incoming packets and to process packets in accordance with the packet handling operation(s);

causing a first control apparatus to set the first packet handling operation(s) in the forwarding node(s);

wherein a flow control node(s) intercepts forwarding of packets that do not satisfy a predetermined condition(s) to the forwarding node(s) in accordance with a second packet handling operation(s) set by a second control apparatus; and wherein the second control apparatus sets a packet handling operation(s) having a longer valid period(s) in the flow control node(s) than a valid period(s) of a packet handling operation(s) set in the forwarding node(s).

* * * * *